United States Patent [19]

Aizawa et al.

[11] Patent Number: 4,797,169

[45] Date of Patent: Jan. 10, 1989

[54] METHOD AND APPARATUS FOR ASSEMBLING VENEER SHEET INTO A PLYWOOD

[75] Inventors: Tadashi Aizawa, Nagoya; Toshimichi Nishiyama, Tokai; Masaru Okawa, Aichi; Kazuo Nakane, Nishio, all of Japan

[73] Assignee: Hashimoto Denki Co. Ltd., Japan

[21] Appl. No.: 67,696

[22] Filed: Jun. 29, 1987

[30] Foreign Application Priority Data

| | | | |
|---|---|---|---|
| Jul. 2, 1986 | [JP] | Japan | 61-155277 |
| Jul. 9, 1986 | [JP] | Japan | 61-161453 |
| Nov. 14, 1986 | [JP] | Japan | 61-272611 |

[51] Int. Cl.[4] .......... B32B 31/00

[52] U.S. Cl. .......... 156/64; 156/297; 156/299; 156/558; 156/559; 156/563; 156/363; 271/227

[58] Field of Search .......... 156/299, 297, 563, 362, 156/559, 556–558, 580, 64; 271/150, 151, 227, 199, 216, 110

[56] References Cited

U.S. PATENT DOCUMENTS

| | | | |
|---|---|---|---|
| 3,133,850 | 5/1964 | Alenius | 156/299 X |
| 3,795,560 | 3/1974 | Matsumoto et al. | 156/563 X |
| 4,228,886 | 10/1980 | Moran | 271/227 X |
| 4,466,856 | 8/1984 | Paakki | 156/563 X |

FOREIGN PATENT DOCUMENTS

| | | | |
|---|---|---|---|
| 54-1461 | 6/1979 | Japan . | |
| 291123 | 12/1986 | Japan | 156/510 |
| WO 83/02744 | 8/1983 | PCT Int'l Appl. . | |
| 2154518 | 9/1985 | United Kingdom | 156/405.1 |

*Primary Examiner*—Michael W. Ball

*Assistant Examiner*—Jeff H. Aftergut

*Attorney, Agent, or Firm*—Barnes & Thornburg

[57] ABSTRACT

A method for assembling veneer sheet into a plywood comprising the steps of supplying the veneer sheets to a feed conveyer, stopping the veneer sheet so that the forward edge thereof is precisely oriented in the transverse direction perpendicular to the feed direction, detecting the position of the veneer sheet in the transverse direction and calculating deviation thereof from a reference line extending along the feed direction by a computer, and transporting the veneer sheet by a transfer unit to a position on an assembling conveyer for fabricating a stepped lamination. The assembling conveyer extends parallel to the feed conveyer and is operated intermittently. The transfer unit includes a holding member for holding the veneer sheet during the transportation and is controlled by the computer for correcting the deviation while transporting the veneer sheet.

28 Claims, 6 Drawing Sheets

METHOD AND APPARATUS FOR ASSEMBLING VENEER SHEET INTO A PLYWOOD

BACKGROUND OF THE INVENTION

1. Field of the Invention

The present invention relates to a method and an apparatus for automatically assembling veneer sheets into a continuous plywood having desired number of layers and, more particularly, to a method and an apparatus for laminating the veneer sheets in a stepped manner so that joints in each layer or ply are longitudinally spaced from the joints in the vertically adjacent plies at a predetermined distance.

2. Description of the Prior Art

The plywood having the stepped lamination is often called as a laminated veneer lumber (LVL) or laminated veneer board (LVB). The longitudinal intervals at which the joints in one ply are spaced from the joints in the adjacent plies must be at least more than eight a to ten times as large as a thickness of the veneer sheet and are preferably more than twenty times as large as the thickness. If the interval is too short, the plywood has only an insufficient strength and tends to fracture along the joints. The joints are usually visible in the side surfaces of plywood and, therefore, arrangement of the joints at regular intervals improves an external appearance of the plywood and generally increases value thereof in the market.

The plywood of this kind has conventionally been manufactured by first forming each ply by joining the veneer sheets of a uniform size together along the longitudinal direction. Butt joint may be used in which vertical edges of the sheets are joined, but it is preferable to use a scarf joint in which the edges to be joined are beveled in the opposite directions. The plies are then laminated one on another in a stepped manner. This conventional method is however disadvantageous from a viewpoint of efficiency because of the separate two steps, i.e. joining and laminating steps.

Japanese Patent Publication No. 54-14641 discloses an apparatus for laminating the veneer sheets while simultaneously elongating the plies by adding one sheet to the rear end of each ply in sequence. The apparatus includes a roller conveyor disposed within a housing having a lower open end, the housing being maintained in sub-atmospheric pressure so that the veneer sheets coated with glue can be fed along the lower surface of the conveyor. A plurality of abutments are provided at longitudinally regular intervals in the forward end portion of conveyor and are selectively movable to project into the path for stopping the veneer sheets. When the veneer sheet is stopped by one of the abutments the rollers of the conveyor are lowered away from the housing, whereby the veneer sheet is released from the rollers and falls down to an assembling conveyor that extends just below the roller conveyor. The assembling conveyor is adapted to be driven intermittently for forwarding the veneer sheets a distance equal to the longitudinal length thereof by one operation. Thus, by moving the abutments in sequence, the veneer sheets are stopped at different positions so that they are step-laminated and added to the rear ends of the respective plies.

A similar arrangement is also disclosed in PCT International Application as published under No. WO 83/02744. An apparatus therein has a stopper movable along the longitudinal direction so as to stop the veneer sheets at desired positions. For each veneer sheet, the stopper is adapted to move to a position just above the rear edge of the ply to which the veneer sheet is to be added. It is described that the veneer sheet thus stopped is then guided to the ply.

The veneer sheets, however, tend to be displaced both in the longitudinal and transverse directions due to inertia force and frictional resistance when they are transferred or fall down. The longitudinal displacement causes an overlap of or a gap between the edges to be joined, while the transverse displacement prevents the side surfaces of the plywood from becoming smooth and flat. Furthermore, the veneer sheets supplied from a mass thereof are not always centered along the longitudinal axis of the feed conveyor and, therefore, the veneer sheets when stopped often deviate from a predetermined position in the transverse direction, which also results in uneven side surfaces of the plywood. Thus, the known devices are still unsatisfactory.

Accordingly, an object of the present invention is to provide a method and an apparatus for assembling veneer sheets into a plywood, which enables to simultaneously connect and laminate in a step manner the veneer sheets precisely without causing any overlaps and gaps in the joints and any uneven portions in the side surfaces.

Another object of the invention is to provide a method and an apparatus which permits automatic manufacture of a plywood without manual operations for adjusting positions of the veneer sheets.

A further object of the invention is to provide a method and an apparatus which enables to transport and place the veneer sheets to precise positions for assembly.

SUMMARY OF THE INVENTION

According to the present invention, a method for assembling veneer sheets into a plywood starts with the step of supplying the veneer sheets of a uniform size to feed means extending in the longitudinal direction, and the veneer sheet fed on the feed means is stopped to orient its forward edge precisely in the transverse direction perpendicular to the feed direction. Then the position of the veneer sheet in the transverse direction is detected to calculate by a computer any deviation thereof from a reference line extending along the feed direction. Subsequently, the veneer sheet is transported by a transfer unit to a position on an assembling conveyor for a stepped lamination, the assembling conveyor extending parallel to the feed means and adapted to be operated intermittently. The transfer unit includes means for holding the veneer sheet during the transportation and is controlled by the computer for correcting the deviation while transporting the veneer sheet.

The transporting step may include the step of controlling the transfer unit to move different lengths for different plies along the longitudinal direction during the transportation to thereby complete the stepped lamination.

Preferably, the method further includes the steps of detecting length of movement of the assembling conveyor and comparing the length with a stored value for determining an error. The transporting step may include the step of moving the transfer unit along the longitudinal direction during the transportation by a distance corresponding to the error.

An apparatus according to the invention for assembling veneer sheets into a plywood comprises means for supplying the veneer sheets having a uniform size and a feed conveyor for forwarding the veneer sheets. A spreading assembly is disposed in the feed conveyor for spreading glue on at least one of the upper and lower surfaces of the veneer sheets. At least one abutment stops the veneer sheet on the feed conveyor, whereby the forward edge of the veneer sheet is precisely oriented to extend in the transverse direction perpendicular to the feed direction. Detecting means detects the position of the edge of the stopped veneer sheet extending in the feed direction. An assembling conveyor extends parallel to the feed conveyor and is adapted to be moved intermittently at predetermined time intervals. A transfer unit transports the stopped veneer sheet to a position on the assembling conveyor and includes means for holding the veneer sheet during entire travel of the transportation. The apparatus further comprises control means connected to the detecting means and the transfer unit for: detecting deviation of the stopped veneer sheet from a reference line extending in the feed direction; and moving said transfer unit in such a manner as to fabricate a stepped lamination of the veneer sheets on the assembling conveyor while correcting length of the transverse movement of the transfer unit on the basis of the detected deviation.

Preferably, the holding means of the transfer unit comprises a hollow body movable in the vertical direction and having a draft lower surface, and a suction device mounted in the hollow body whereby the lower surface thereof holds the veneer sheet by means of a suction force.

In one embodiment of the invention, the transfer unit includes means for selectively rotating the holding means by an angle of 90 degrees during the transportation of the veneer sheet. A trimming device is disposed in the feed conveyor for trimming the longitudinal edges of the veneer sheet whereby the venner sheet is formed in a substantially square shape.

Other objects, features and advantages of the invention will be apparent from the following detailed description thereof when taken in conjunction with the accompanying drawings.

DETAILED DESCRIPTION OF THE INVENTION

Figure 1:
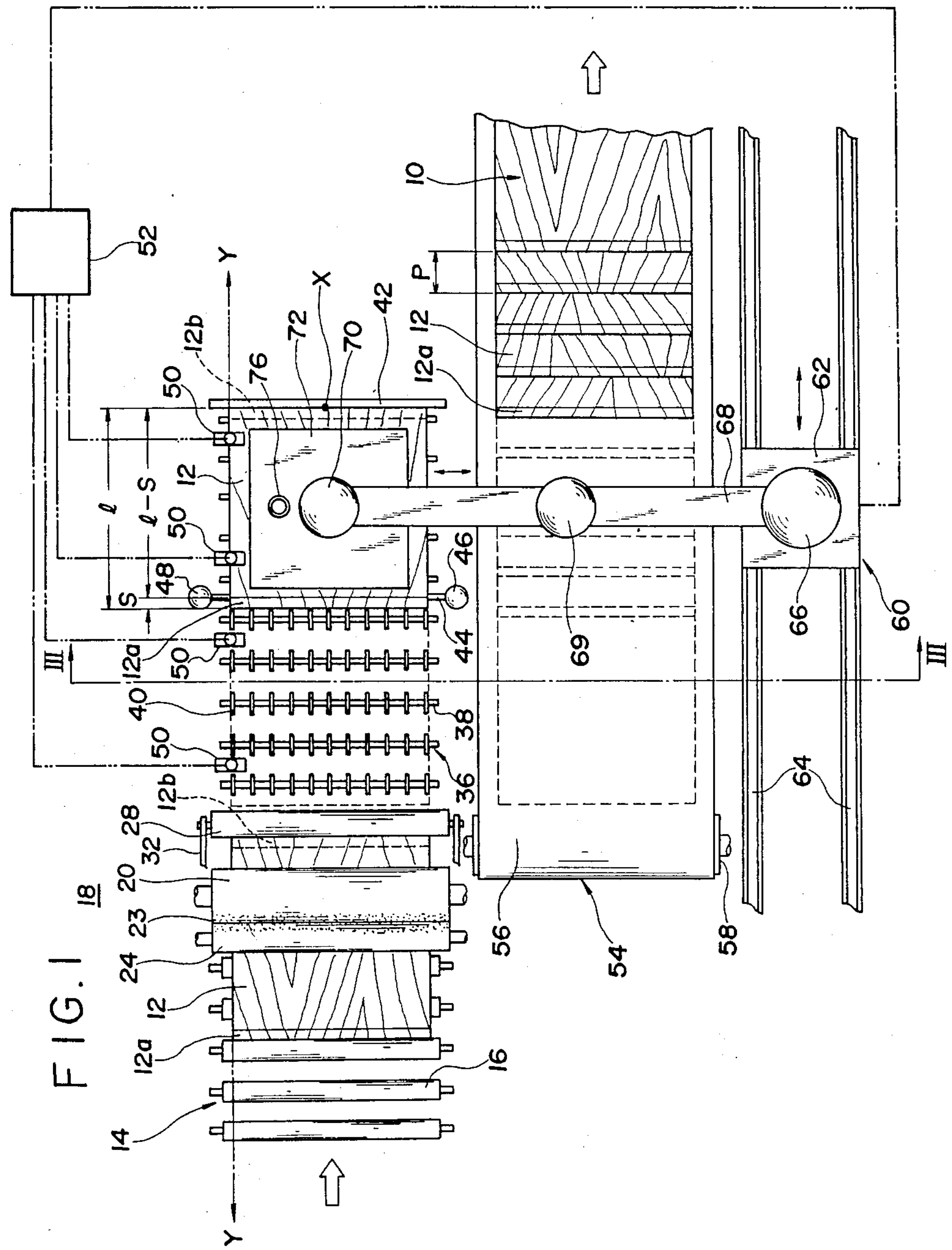
FIG. 1 is a schematic plan view illustrating an apparatus according to an embodiment of the present invention.
Figure 2:
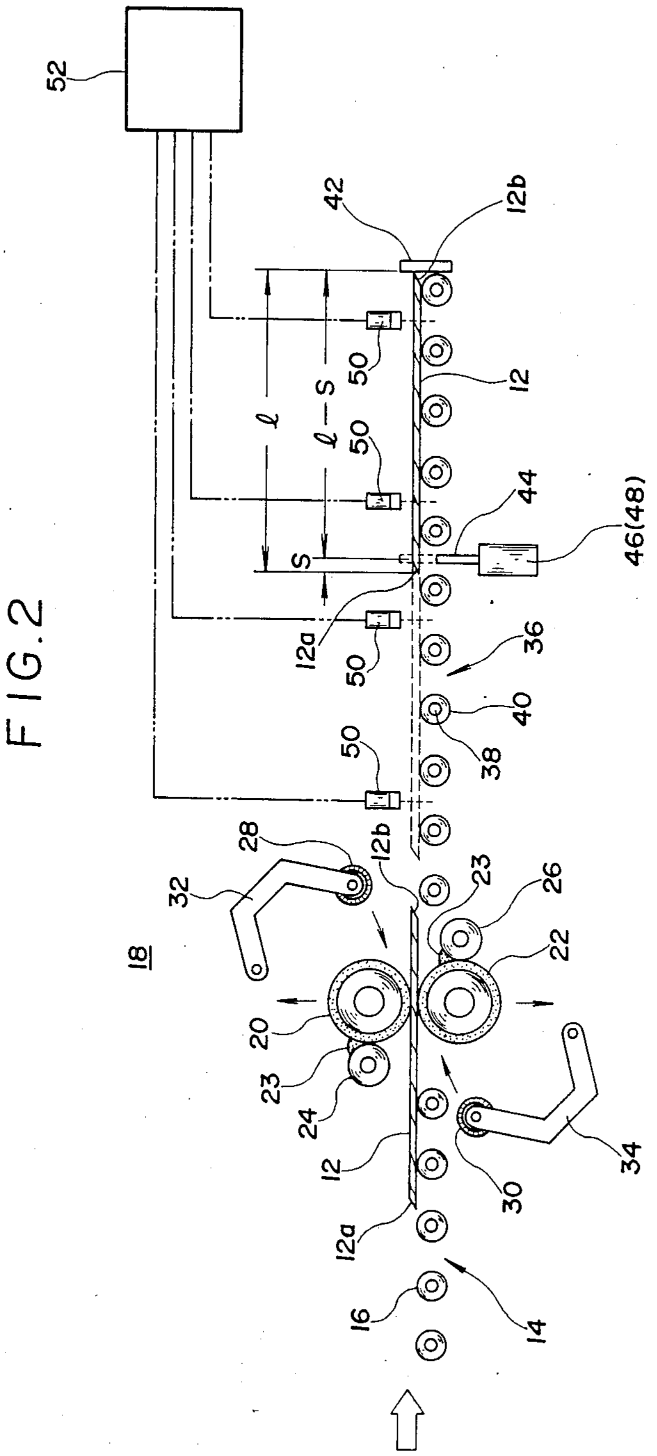
FIG. 2 is a side elevational view showing a feed conveyor and various parts arranged along the feed conveyor of the apparatus in FIG. 1.
Figure 3:
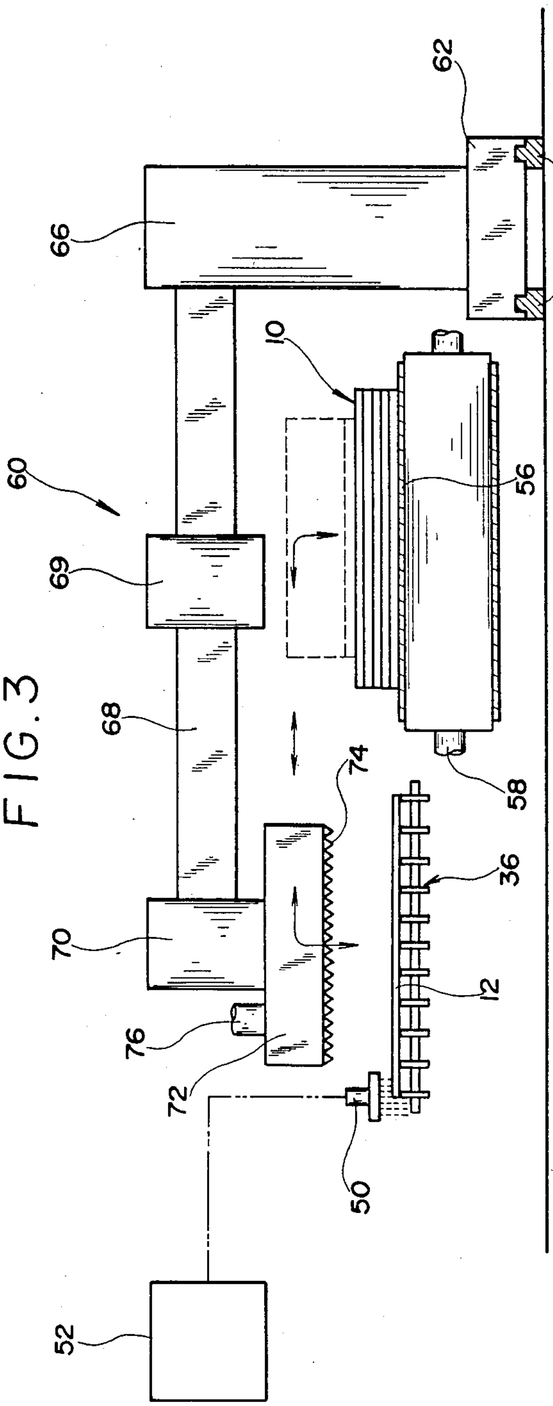
FIG. 3 is a cfoss sectional view taken along a line III—III in FIG. 1.

Referring to FIGS. 1 to 3 of the drawings, an apparatus for assembling veneer sheets or boards into a plywood is illustrated which includes a conveyor 14 comprising a plurality of transverse rollers 16 to be rotated by any suitable means. The conveyor 14 are adapted to feed veneer sheets 12 forwardly, i.e. toward the right-hand side of the drawing with the lower surface of the veneers resting upon the rollers 16.

Adjacent the forward end of the conveyor 14 the rollers 16 are spaced from each other at a distance sufficient to arrange a spreading assembly 18 between the rollers. In the illustrated embodiment the assembly 18 has a pair of movable spreading means for applying glue or adhesive material onto the surfaces of the veneer sheets 12, which comprise spreader rolls 20 and 22 and doctor rolls 24 and 26 as seen from FIG. 2. The spreader rolls 20 and 22 combined with the respective doctor rolls 24 and 26 are connected to drive means such as air cylinders (not shown) which move the spreader rolls in a vertical direction in FIG. 2. The spreader roll 20 is adapted to apply in cooperation with the doctor roll 24 the glue 23 onto the upper surface of veneer sheets 12 when lowered to an operative position of FIG. 2, while the spreader roll 22 is onto the lower surface when maintained in an elevated position. Pinch rolls 28, 30 are provided on the opposite sides of the veneer sheets and are pivotably secured to one ends of arms 32, 34 which are pivoted at the other ends for swing motion. Movement of these arms is associated with the vertical movement of spreader rolls 20, 22 so that when the roll 20 is moved upward the pinch roll 28 comes into contact with the upper surface of veneer sheet to press the latter against the spreader roll 22, and vice versa. It should be noted that application of glue may be performed by other mechanisms such as glue extruder or spraying device.

Provided following the roller conveyor 14 is a feed unit 36 which comprises transversely extending, lcngitudinally spaced shafts 38 and a plurality of rings 40 fixedly secured to each shaft for co-rotation therewith. The rings 40 are formed thin and spaced from each other in order to prevent the veneer sheets 12 previously coated with the glue from adhering to the unit 36 and to keep substantial amount of the glue from being removed from the veneer sheets. The feed unit 36 longitudinally extends to the forward end where an end wall 42 is fixedly secured to discontinue the travel of veneer sheets 12 and to maintain the same in position.

In this embodiment, an additional stopper means is provided longitudinal midway of the feed unit 36 and comprises an abutment plate 44 supported at the transverse ends by drive means such as air cylinders 46, 48. The abutment plate 44 is adapted to project beyond a path of the veneer sheets for stopping the same and to retract below the path for permitting the veneer sheets to continue to travel up to the end wall 42. The abutment plate 44 is spaced from the end wall 42 at a distance equal to the longitudinal length "l" of the veneer sheets 12 except an upwardly directed scarf or beveled portion 12*a*, the length of that portion being indicated by a letter "s" in the drawings. The stoppers 42, 44 havea transverse width sufficiently larger than the width of veneer sheets, so that the continuous feeding action of the unit 36 may cause the entire part of forward edge of veneer sheets to come into contact with the stoppers for alignment.

For measuring a precise position of the veneer sheets 12 in the transverse direction, detecting means is arranged along one longitudinal side of the feed unit 36 and, in th illustrated embodiment, it comprises a plurality of longitudinally spaced detectors 50. The detectors 50 are electrically connected to a computer 52 for measuring deviation of the longitudinal edge of veneer sheets from a predetermined reference line as indicated by letters Y—Y in FIG. 1. Each detector 50 is oriented perpendicularly to the reference line, with the latter crossing a center of the detector, and includes a light emitter such as diode and a photoelectric device such as photoelectric switching device or photocell which transfers the light to an electric signal. Plural emitters and photoelectric devices may be provided in each detector 50 along its axis perpendicular to the reference line. Alternatively, the detector may have a single emitter and photoelectric device adapted to be moved along the axis of the detector and include a position sensor such as encoder.

Extending in parallel with the feed unit 36 and transversely spaced therefrom is an assembly line 54 which comprises an endless belt 56 extending between an idle roller 58 and an intermittently driven roller (not shown). On this assembly line 54 the veneer sheets 12 are joined together along the longitudinal direction and laminated in a predetermined number of plies to form a continuous product 10, as described hereinafter. The product 10 is intermittently fed to a hot press machine (not shown) of any ordinary type where bonding of the veneer sheets is completed.

An automatic transfer unit 60 is provided to transfer the veneer sheets from the feed unit 36 to a precise position on the assembly line 54. As best shown in FIG. 3, the unit 60 has a base 62 mounted for movement on guide rails 64—64 which extend in parallel with the endless belt 56, and a vertical post 66 fixed to the base 62. An articulated arm 68 having a joint 69 at the center thereof projects transversely from the post 66 just below its top end to extend across the assembly line 54 and terminate at a head 70 located above the feed unit 36. The head 70 supports veneer holding means which, in the illustrated embodiment, comprises a hollow body 72 incorporating a suction device (not shown) such as blower for holding the veneer sheets 12 by a draft lower surface 74 while exhausting air from an outlet 76. The surface 74 is toothed so that the air may be sucked into the hollow body 72 through gaps between the sheets and the bottom of surface 74 to thereby act a suction force against the sheets. Valve means (not shown) is disposed within the hollow body 72 to control the suction force so that the lower surface 74 can hold and release the veneer sheets according to an operation of the valve means. Suitable drive means such as air cylinder (not shown) is also provided within the head 70 for moving the hollow body 72 in the vertical direction in FIG. 3 with respect to the head 70, so that the lower surface 74 may approach the veneer sheets 12 on the feed unit 36 and raise them for transportation onto the assembly line 54.

It will be appreciated that various structures may be adopted for the veneer holding means. For example, the head 70 may have a retractable needle member adapted to be stuck into the veneer sheet and pulled out therefrom by claw means which may be mounted on the assembly line to operate when the veneer sheet is transported to a position on the endless belt 56.

The transfer unit 60 includes actuators such as servomotors (not shown) which move the unit 60 in the longitudinal direction along the guide rails 64, fold and expand the articulated arm 68, activate the air cylinder in the head 70 for lowering and elevating the hollow body 72, and operate the valve means in the hollow body 72. These actuators are controlled by signals from the computer 52 in which are stored data including: the transverse distance between the feed unit 36 and the assembly line 54; longitudinal positions of the stoppers 42 and 44; period of time during which the endless belt 56 is intermittently forwarded; a thickness of the veneer sheet; a predetermined sequence for laminating the veneer sheets 12 to form the continuous product 10; a longitudinal distance, as indicated by a letter "P" in the illustrated embodiment, between the adjacent two layers or plies, and the like.

A method for assembling the veneer sheets by using the above apparatus will now be described. First, the veneer sheets having a uniform size are prepared from a strip of wood and are processed by a scarf machine such as planer or tenoner of any conventional type so that the opposite edges, which are substantially perpendicular to the grain of wood, are beveled or scarfed in the opposite directions as seen at 12*a* and 12*b*. The length "s" of each scarf is preferably in the range of four to eight times as long as the thickness "t" of veneer sheets.

The veneer sheets 12 thus formed are supplied onto the conveyor 14 in such a manner that the grain of wood is oriented in the longitudinal direction of the apparatus with the downwardly directed scarfs 12*b* constituting the front ends of the sheets. When the veneer sheets 12 traveling on the conveyor 14 pass through the spreading assembly 18, the upper and/or lower surfaces thereof can be glued by the spreader rolls 20 and/or 22. For example, if the glue is to be spread only on the upper surfaces, the roll 20 performs it in cooperation with the pinch roll 30 for the sheets which are intended to form lower plies of the product 10. For those sheets as used to form the uppermost ply, both pinch rolls 28 and 30 are brought to their operative position instead of the spreader rolls. 0n the other hand, if it is desired to minimize the number of sheets on which the glue is applied, both spreader rolls 20 and 22 are maintained in the operative position for the sheets for even-numbered plies, i.e. for the second and fourth plies in the illustrated embodiment, while both pinch rolls 28 and 30 are operated for the other sheets.

The feed unit 36 has the veneer sheet 12 continue the travel in the longitudinal direction until it abuts against the stopper which also serves to correctly orient the sheet such that the front edge thereof becomes perpendicular to the longitudinal direction of the feed unit 36. In FIGS. 1 and 2, the movable stopper 44 is maintained in the lowered position and therefore the sheets are fed to the end wall stopper 42 which serves as a reference point X in the longitudinal direction. Then the detectors 50 detect the presence of longitudinal edge of the sheet 12 and send signals to the computer 52 which, in turn, calculates deviation of the edge from the reference line Y—Y, the calculated data being stored in a memory. The detection and calculation are executed whenever the veneer sheets 12 are fed to the stoppers, so that the deviation thereof may be individually corrected during transportation as hereinafter described.

Thereafter the computer 52 send signals to the transfer unit 60 so that the hollow body 72 is lowered from the illustrated position until the lower surface 74 comes into contact with the upper surface of veneer sheet. After operating the valve means to hold the sheet on the surface 74 by the action of suction force, the body 72 is elevated and the head 70 is linearly moved in the tranverse direction by folding the arm 68. At this time, a correction is made to the distance of movement of the head 70 on the basis of the measured deviation of the sheet 12, whereby the head 70 always transports the sheets to a precise position above the assembly line 54. In case that the sheet 12 is used to form the first ply, only the transverse movement of the head 70 is required and the body 72 is lowered to place the sheet in position on the endless belt 56 where the scarf **12*b* of the newly transported sheet is joined to the scarf 12*a* of the previously assembled, rearmost sheet in the first ply. Then the sheet is released from the body 72** by closing the valve means.

The next step is to add one sheet to the second ply in which the joints 13 are spaced by the distance P from those in the first ply. When the computer 52 determines according to the programmed sequence that the sheet is for the second ply, it sends signals to the transfer unit 60 to move the base 62 longitudinally forwardly along the guide rails 64 by the distance P. Therefore, the head 70 performs a combined movement in the transverse and longitudinal directions for transporting the veneer sheet to a position where the sheet is joined to the rearmost sheet in the second ply, with the body 72 descending a distance smaller than that in case of the first ply by the thickness t of the sheet. After the body 72 releases the sheet, the unit 60 returns to the position of FIG. 1 for holding the next sheet on the feed unit 36. Similarly, the unit 60 is controlled to move in the longitudinal direction by a distance (P×2) when joining the sheet to the third ply, (P×3) for the fourth ply and (P×4) for the fifth ply.

After the veneer sheets 12 are laminated into a predetermined number of plies, the abutment plate 44 is raised beyond the path of the sheets to function as the stopper. At the same time, the unit 60 is moved rearwardly along the rails 64 by the distance (l−s) so that the head 70 may be positioned above the sheets stopped by the plate 44. Then the steps as described above are repeated to add one more sheet to each ply.

As will be apparent, these assembling operations are carried out during the endless belt 56 is suspended. After the two sheets are added to each ply, the driven roller is rotated to forward the endless belt 56 by the distance {(l−s)×2} so that the rear end of the product 10 will be in the position of FIG. 1 for subsequent assembling operations. The time interval of intermittent motion of the endless belt 56 depends on a time required for completing the hot press of the product 10. Thus, if the hot press can be speeded up, the endles belt 56 may be adapted to move every time one sheet is added to each ply of the product and, in that case, the movable stopper 44 may be omitted. Alternatively, an additional transfer unit may be provided in parallel with the unit 60 and to cooperate with the movable stopper 44. In this case, the stopper 44 operates in such a manner that it permits alternate veneer sheets to go to the end wall stopper 42 and stops the other sheets, and the transfer units operate alternately.

In the illustrated embodiment, the transfer unit 60 is adapted to be moved also in the longitudinal direction for obtaining the stepped lamination. If desired, this may be achieved without the longitudinal displacement of the unit 60 after it holds the sheets, by providing plural movable stoppers arranged at intervals P along the longitudinal direction. A rearmost stopper, which is farthest from the fixed stopper, is first operated to stop the sheet for use in the first ply and is then retracted to permit the next sheet for the second ply to go to a second stopper, these operations being repeated until the fixed stopper stops the sheet for the uppermost ply.

Figure 4:
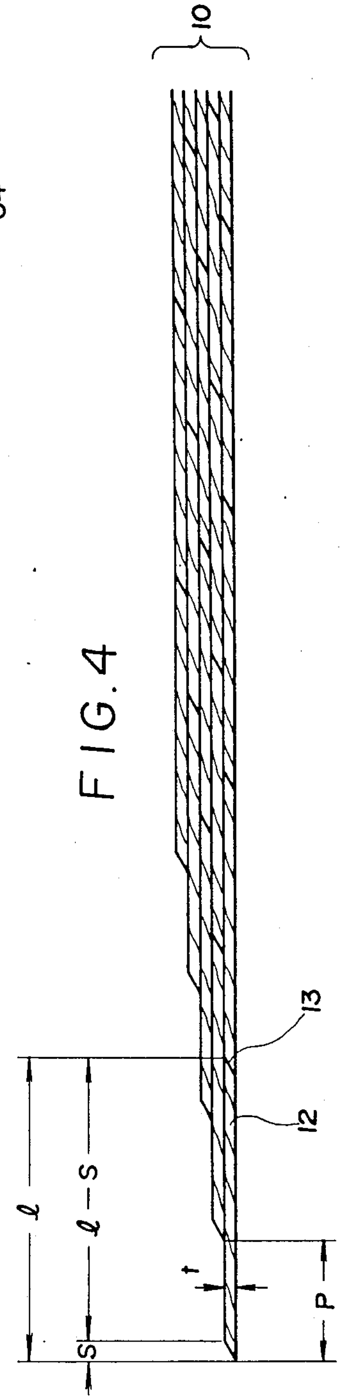
FIG. 4 is a longitudinally sectioned side view illustrating a continuous product manufactured in accordance with the invention.

FIG. 4 illustrates the product 10 formed in accordance with the above method. Since the deviation of the veneer sheets in the transverse direction, which may arise during the feeding operation, is corrected when the sheets are transferred onto the assembly line, the longitudinal edges of the veneer sheets 12 are precisely aligned with each other to thereby provide flat, smooth side surfaces of the product 10. Also, the scarf portions **12*a* and 12*b* are joined together without creating overlapping or hollow space therebetween, because the computer-controlled transfer unit 60 places the veneer sheets 12** on their predetermined positions. In this connection, it should be noted that the present invention is also applicable to an assembly of a product of butt joint type in which are used veneer sheets having vertical transverse edges.

Figure 5:
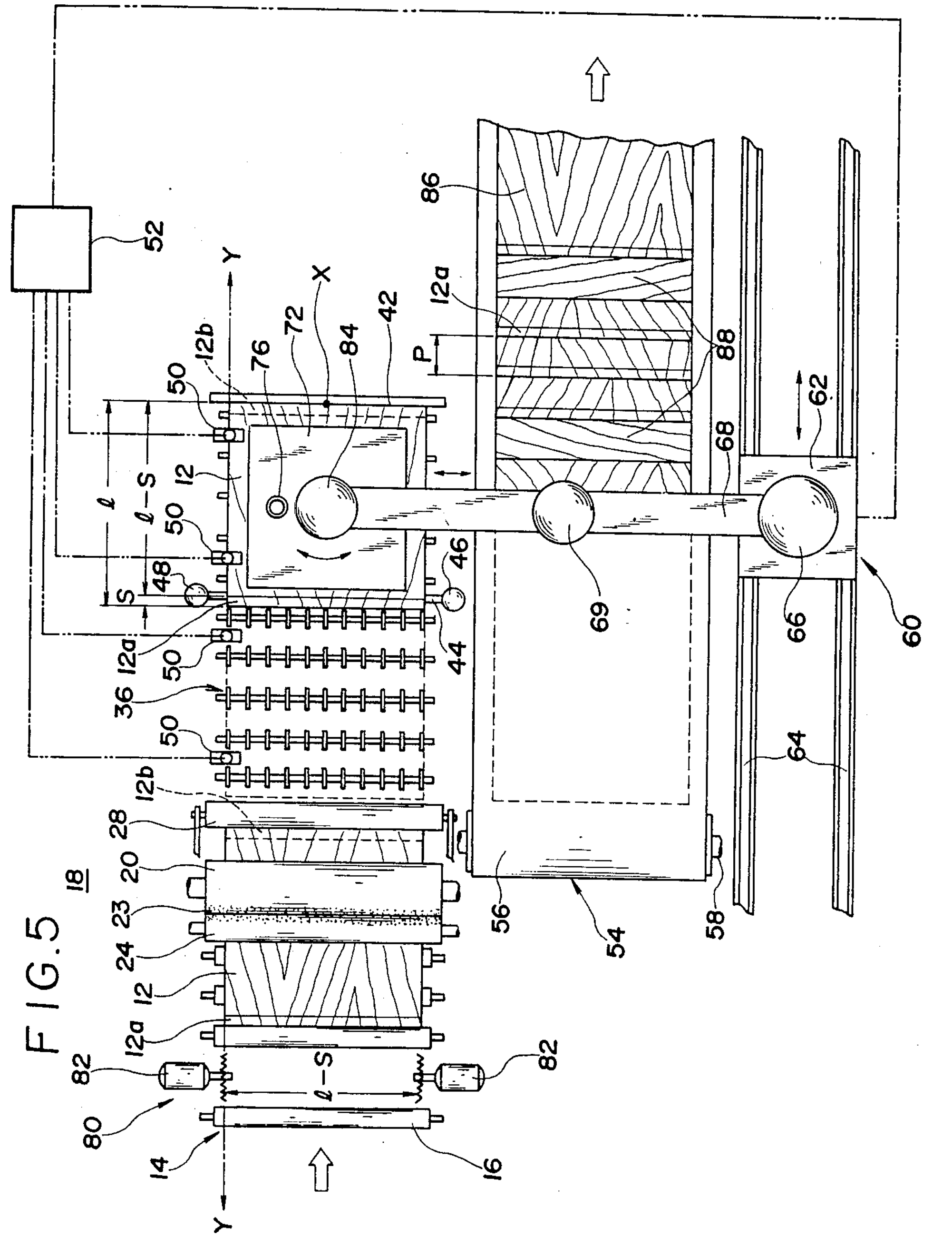
FIGS. 5 and 6 are top and side elevational views, respectively, of an apparatus according to another embodiment of the invention.
Figure 6:
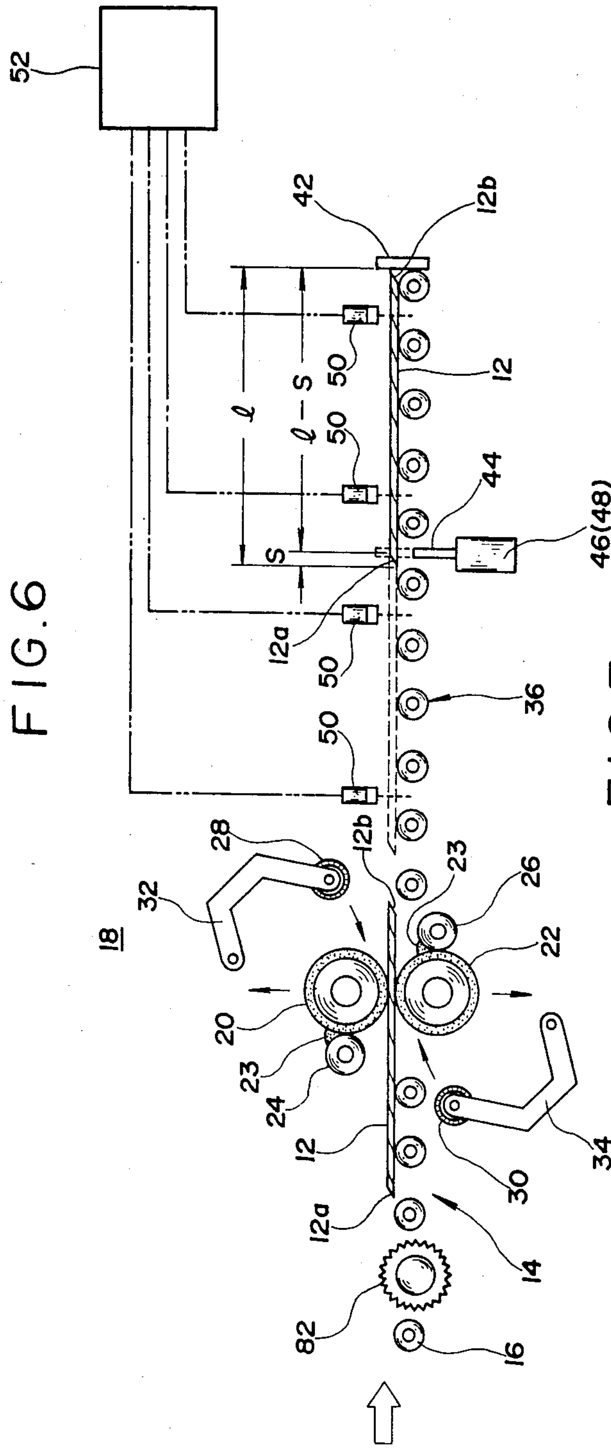

Plywood often includes a so-called cross band which is a layer having grains oriented in a direction perpendicular to the direction of grains of the other layers and is interposed between the other layers to prevent the plywood from warping. Referring to FIG. 5 in which the same reference numerals as used in FIG. 1 are used to designate same or corresponding parts, an apparatus includes a mechanism for automatically forming the cross band. The mechanism comprises a trimming assembly 80 disposed between the rollers 16 of the conveyor 14 prior to the spreading assembly 18, and in the illustrated embodiment the assembly 80 includes circular saws 82—82 arranged on the opposite sides of conveyor 14 and spaced from each other by the distance (l−s). These saws 82 are adapted to be electrically driven for trimming the longitudinal edge portions of the veneer sheets 12 which originally had a width equal to or greater than the length l.

The veneer sheets thus trimmed are fed through the spreading assembly 18 to the feed unit 36 which further forwards the sheets to the stopper, i.e. to the end wall stopper 42 in the illustrated state. After deviation of the longitudinal edge of the sheets from the reference line Y—Y is measured by the detectors 50, the computer 52 sends signals to the transfer unit 60 to transport the sheets onto the assembly line 54 while correcting the deviation, all in the manner as described above. In this embodiment, however, a head 84 of the unit 60 has a rotary drive means such as a motor (not shown) adapted to rotate the hollow body 72 by an angle of 90 degrees, the rotary drive means being controlled by the computer 52 which is programmed to determine whether the particular sheet is used for the cross band. Thus, when it is determined that the sheet is for the cross band, the computer 52 instructs the head 70 to rotate the hollow body 72 after the latter holds the sheet, whereby the wood grains is oriented in the transverse direction during the transportation to the assembly line 54. It should be noted that no correction is required for the longitudinal movement of the unit 60 when it transports the cross band sheets, because the rotated sheets have the length (l−s) with the vertical edges formed by the circular saws 82.

Figure 7:
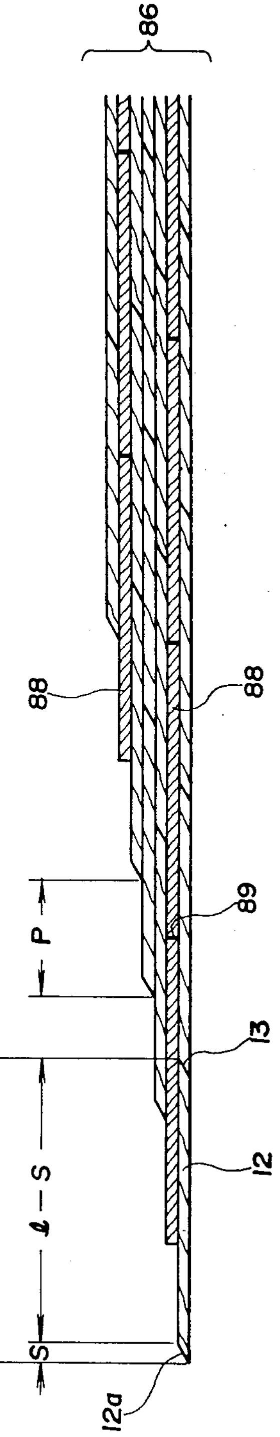
FIG. 7 is a longitudinally sectioned side view illustrating a continuous product manufactured by the apparatus in FIGS. 5 and 6.

In this manner a product 86 having the cross bands 88 is assembled as shown in FIG. 7. The cross band 88 is fabricated by joining the sheets at their vertical edges which forms butt joints 89 arranged at intervals (l−s). This means that the joints 89 are also spaced from the scarf joints 13 in the adjacent plies by the distance P.

If scarf joints are also desired for the cross bands, the circular saws 82 may be replaced by suitable devices which process the longitudinal edges of veneer sheets into scarfs with maintaining the width.

Figure 8:
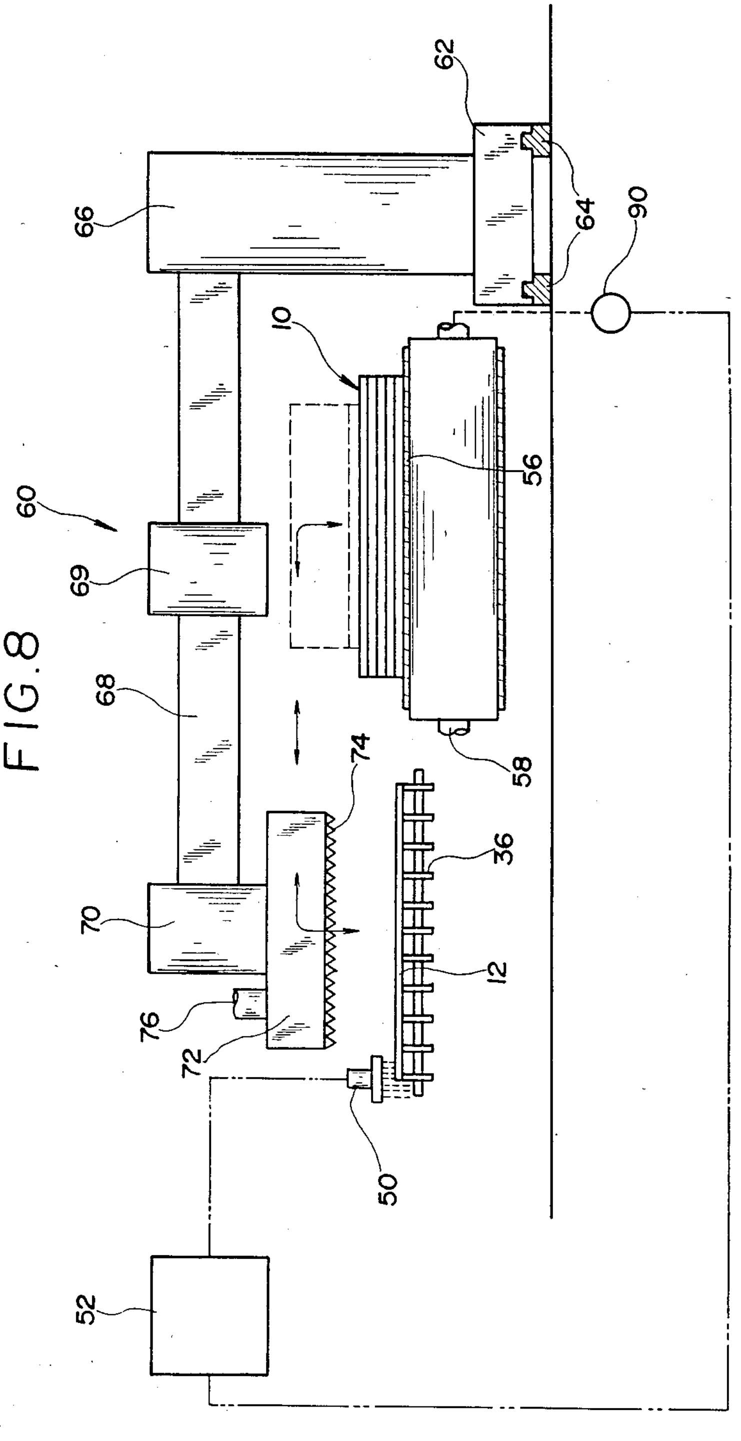
FIG. 8 is a view similar to FIG. 3 of an apparatus according to still another embodiment of the invention.

An intermittent conveyor often invloves slight errors in its movement. For example, if the endless belt 56 is designed to move 2 meters by one cycle, it is not unusual that the belt actually moves 1.98 to 2.02 meters. Accordingly, it is preferable to measure such errors each time the belt 56 is moved and to correct the errors by the longitudinal movement of the transfer unit 60. For this purpose, an embodiment as illustrated in FIG. 8 has an encoder 90 mounted in the roller 58 of the assembly line 54 and adapted to send pulse signals to the electrically connected computer 52 when the roller 58 is rotated. Based on those pulse signals, the computer 52 measures an actual travel length of the endless belt 58, compares it with a predetermined value and determine an error which is stored in the memory.

Thereafter, when the unit 60 transports the veneer sheet 12 onto the endless belt 56 to add it to the first ply, the unit 60 is controlled to move along the rails 64 by a distance corresponding to the measured error of the belt 56. Similar operations are repeated until the sheet is added to the uppermost ply, while correcting the predetermined longitudinal movement of the unit 60 for completing the stepped lamination.

Although the invention has been described with reference to the preferred embodiments thereof, many modifications and alterations may be made within the spirit of the invention.

What is claimed is:

1. A method for assembling veneer sheets into a plywood comprising the steps of:

- supplying the veneer sheets having a uniform size to feed means extending in the longitudinal direction;
- stopping the veneer sheet on said feed means to orient the forward edge of the veneer sheet precisely in the transverse direction perpendicular to the feed direction;
- detecting the position of the veneer sheet in the transverse direction and calculating deviation thereof from a reference line extending along the feed direction by a computer;
- transporting the veneer sheet by a transfer unit to a position on an assembling conveyor for fabricating a stepped lamination, said assembling conveyor extending parallel to said feed means and adapted to be operated intermittently, and said transfer unit including means for holding the veneer sheet during the transportation;
- detecting length of movement of said assembling conveyor and comparing said length with a stored value by said computer for determining an error; and
- controlling said transfer unit by said computer for correcting said deviation and said error while transporting the veneer sheet.

2. A method as claimed in claim 1, further comprising the step of spreading glue on at least one of the upper and lower surfaces of the veneer sheets prior to the stop.

3. A method as claimed in claim 1, wherein said veneer sheets transporting step includes the step of controlling said transfer unit to move different lengths for different plies along the longitudinal direction during the transportation to thereby complete the stepped lamination.

4. A method as claimed in claim 1, wherein said veneer sheets stopping step comprises stopping the veneer sheets for different plies by different stoppers arranged at equal intervals along the longitudinal direction, and further comprising the step of moving said transfer unit to a longitudinal position corresponding to each said stopper prior to each said transporting step.

5. A method as claimed in claim 1, wherein the veneer sheets are supplied to said feed means in such a manner that wood grains extend substantially in the longitudinal direction.

6. A method as claimed in claim 5, further comprising the step of trimming the longitudinal edges of the veneer sheets for obtaining a substantially square shape, and wherein said transporting step includes selectively rotatingsaid holding means by an angle of 90 degrees to thereby orient wood grains of the veneer sheets for a cross band in the substantially transverse direction.

7. A method as claimed in claim 1, wherein said detecting step comprises detecting presence of the longitudinal edge of the veneer sheet by photoelectric means.

8. A method as claimed in claim 1, wherein said transporting step includes moving said transfer unit along the longitudinal direction during the transportation by a distance corresponding to said error.

9. A method as claimed in claim 1, wherein said veneer sheets supplying step further includes the step of beveling the transverse edges of each veneer sheet in the opposite directions.

10. An apparatus for assembling veneer sheets into a plywood comprising:

- means for supplying the veneer sheets having a uniform size;
- a feed conveyor for forwarding the veneer sheets along a path;
- a spreading assembly disposed in said feed conveyor for spreading glue on at least one of the upper and lower surfaces of the veneer sheets;
- at least one abutment for stopping the veneer sheet on said feed conveyor whereby the forward edge of said veneer sheet is precisely oriented to extend in the transverse direction perpendicular to the feed direction;
- detecting means for detecting the position of the edge of the stopped veneer sheet extending in the feed direction;
- an assembling conveyor extending parallel to said feed conveyor and adapted to be moved intermittently at predetermined time intervals;
- means for measuring length of movement of said assembling conveyor;
- a transfer unit for transporting the stopped veneer sheet to a position on said assembling conveyor, said transfer unit including means for holding the veneer sheet during entire travel of the transportation; and
- control means connected to said detecting means, said measuring means and said transfer unit for: detecting deviation of the stopped veneer sheet from a reference line extending in the feed direction; comparing the measured length of movement of said assembling conveyor with a present value for determining an error, and moving said transfer unit in such a manner as to fabricate a stepped lamination of the veneer sheets on said assembling conveyor while correcting the length of the transverse movement of said transfer unit on the basis of the detected deviation and of the longitudinal movement of said transfer unit on the basis of the determined error.

11. An apparatus as claimed in claim 10, wherein said spreading assembly includes spreader rolls disposed in opposite sides of the path of veneer sheets and adapted to be moved away and toward the path.

12. An apparatus as claimed in claim 11, wherein said spreading assembly further comprises pinch rolls disposed in opposite sides of the path, each said pinch roll being operable when said spreader roll of the same side is away from the path and pressing the veneer sheet against one of said spreader roll and said pinch roll of the other side.

13. An apparatus as claimed in claim 10, wherein said abutment comprises an end plate fixed to the forward end of said feed conveyor.

14. An appratus as claimed in claim 13, wherein said control means controls said transfer unit to move different lengths for different plies along the longitudinal direction, whereby the veneer sheets are laminated in the stepped manner.

15. An apparatus as claimed in claim 13, wherein said abutment further includes a movable plate spaced upstream of said feed conveyor from said end plate at a distance substantially equal to the longitudinal length of the veneer sheets.

16. An apparatus as claimed in claim 10, wherein said detecting means comprises a photoelectric sensor.

17. An apparatus as claimed in claim 10, wherein said control means controls said transfer unit to move along the longitudinal direction a distance corresponding to the error during the transportation.

18. An apparatus as claimed in claim 10, wherein said measuring means comprises an encoder mounted to a roller of said assembling conveyor.

19. An apparatus as claimed in claim 10, wherein said holding means of said transfer unit comprises a hollow body movable in the vertical direction and having a draft lower surface, and a suction device mounted within said hollow body whereby the lower surface of said hollow body holds the veneer sheet by means of a suction force.

20. An apparatus as claimed in claim 19, wherein said lower surface of said hollow body is toothed.

21. An apparatus as claimed in claim 19, wherein said holding means further comprises valve means for controlling the suction force, said valve means being controlled by said control means to open when said lower surface of said hollow body is brought into contact with the veneer sheet on said feed conveyor and to close for releasing the veneer sheet after the veneer sheet is placed to a position on said assembling conveyor.

22. An apparatus as claimed in claim 19, wherein said transfer unit includes a base adapted to move along the longitudinal direction parallel to said assembling conveyor, a head member supporting said hollow body and movable between a first position above said feed conveyor and a second position above said assembling conveyor, and a transverse member extending between said base and said head member.

23. An apparatus as claimed in claim 22, wherein said transverse member comprises an articulated arm adapted to move said head member in the transverse direction.

24. An apparatus as claimed in claim 22, wherein said head member has drive means for lowering and elevating said hollow body.

25. An apparatus as claimed in claim 10, wherein said transfer unit further includes means for selectively rotating said holding means by an angle of 90 degrees during the transportation of the veneer sheet.

26. An apparatus as claimed in claim 25, further comprising a trimming device disposed in said feed conveyor for trimming the longitudinal edges of the veneer sheet whereby the veneer sheet is formed in a substantially square shape.

27. An apparatus as claimed in claim 26, wherein said trimming device comprises a pair of circular saws spaced from each other at a distance substantially equal to the longitudinal length of the veneer sheet.

28. An apparatus for assembling veneer sheets into a plywood comprising a feeding conveyor for conveying wood sheets having a uniform size from a supply of the sheets along apath, the feeding conveyor including a glue spreading assembly for spreading glue on at least one of tne upper and lower surfaces of each wood sheet as it travels along the path, at least one abutment for stopping the wood sheet on the feeding conveyor at a first position such that the forward edges of the wood sheet is precisely oriented to extend in the transve direction perpendicular to the path, and detecting means for detecting the position of an edge of the wood sheet extending in the path direction when the wood sheet is stopped by the at least one abutment;

an assembling conveyor extending parallel to said feeding conveyor and adapted to be moved intermittently at predetermined intervals including means for measuring the length of movement of the assembling conveyor;

a transfer unit for transporting the wheel sheets from the first position on the feeding conveyor to a position on the assembling conveyor, the transfer unit including means for holding the wood sheet during the transfer;

control means for controlling the transfer unit, the control means including means connected to said detecting means for detecting any deviation of a sheet stopped by said at least one abutment from a reference line extending in the path direction, measuring means for comparing the measured length of movement of the assembling conveyor with a preset value for determining an error; and means for moving said transfer unit in such a manner as to fabricate a stepped lamination of the wood sheets on the assembling conveyor while correcting the length of transverse and longitudinal movement of the transfer unit on the basis of said detected deviation and determined error.

* * * * *